United States Patent
Rein et al.

(10) Patent No.: US 6,923,153 B2
(45) Date of Patent: Aug. 2, 2005

(54) PISTON AND CONNECTING ROD ASSEMBLY HAVING PHOSPHATIZED BUSHINGLESS CONNECTING ROD AND PROFILED PISTON PIN

(75) Inventors: Wolfgang Rein, Milford, MI (US); Norbert Schneider, South Lyon, MI (US)

(73) Assignee: MAHLE Technology, Inc., Farmington, Hills, MI (US)

( * ) Notice: Subject to any disclaimer, the term of this patent is extended or adjusted under 35 U.S.C. 154(b) by 0 days.

(21) Appl. No.: 10/607,174

(22) Filed: Jun. 26, 2003

(65) Prior Publication Data

US 2004/0261751 A1 Dec. 30, 2004

(51) Int. Cl.[7] .............................................. B23P 15/00
(52) U.S. Cl. .................................... 123/193.6; 92/187
(58) Field of Search ................ 123/193.6, 197.3–197.4; 92/187–191, 223

(56) References Cited

U.S. PATENT DOCUMENTS

| | | | |
|---|---|---|---|
| 448,766 A | 3/1891 | Kelliher | |
| 491,974 A | 2/1893 | Barler | |
| 1,489,111 A * | 4/1924 | Blackshear | 403/150 |
| 1,491,155 A * | 4/1924 | McKone | 92/187 |
| 2,202,773 A | 5/1940 | Given | 308/241 |
| 3,479,929 A * | 11/1969 | Fangman | 92/187 |
| 3,935,797 A | 2/1976 | Niimi et al. | 92/223 |
| 3,971,355 A * | 7/1976 | Kottmann | 123/197.2 |
| 4,233,088 A * | 11/1980 | Kronstein | 428/472.3 |
| 4,316,752 A * | 2/1982 | Kronstein | 148/252 |
| 4,430,906 A | 2/1984 | Holtzberg et al. | 74/595 |
| 4,863,513 A * | 9/1989 | Umeha et al. | 75/231 |
| 4,974,498 A | 12/1990 | Lemelson | 92/223 |
| 4,984,544 A * | 1/1991 | DeBiasse | 123/197.4 |
| 5,081,967 A * | 1/1992 | Kemnitz et al. | 123/193.6 |
| 5,158,695 A | 10/1992 | Yashchenko et al. | 252/30 |
| 5,255,592 A | 10/1993 | Lewis, Jr. | 92/223 |
| 5,257,603 A | 11/1993 | Bauer et al. | 123/193.6 |
| 5,352,541 A | 10/1994 | Tanaka et al. | 428/628 |
| 5,549,034 A * | 8/1996 | Loughlin | 92/187 |
| 5,592,927 A | 1/1997 | Zaluzec et al. | 123/668 |
| 5,661,904 A * | 9/1997 | Loughlin | 29/888.01 |
| 5,836,280 A | 11/1998 | Miyazawa | 123/193.4 |
| RE37,565 E | 3/2002 | Bubeck | 92/216 |
| 6,446,436 B1 | 9/2002 | Winkelmann et al. | 60/533 |
| 6,491,013 B1 | 12/2002 | Gaiser et al. | 123/193.6 |
| 6,497,771 B1 | 12/2002 | Schubach et al. | 148/253 |
| 6,557,457 B1 * | 5/2003 | Hart et al. | 92/223 |

* cited by examiner

Primary Examiner—Marguerite McMahon
(74) Attorney, Agent, or Firm—Bliss McGlynn, P.C.

(57) ABSTRACT

The present invention relates to a connecting rod and piston pin assembly for an internal combustion engine to improve wear of the piston/connecting rod pivot point and reduce deformation of the pin bore. To this end, the assembly includes a piston having a pin bore, a connecting rod having a bore adapted to be aligned with the piston pin bore and piston pin interconnecting the piston and the connecting rod through engaging their respective bores. The piston pin has a profiled outer circumference that is substantially circular in cross-section with a larger diameter at the distal ends than at the center portion. One end of the connecting rod includes a phosphatized coating and is adapted to facilitate movement between the connecting rod bore and the profiled piston pin.

13 Claims, 5 Drawing Sheets

PISTON AND CONNECTING ROD ASSEMBLY HAVING PHOSPHATIZED BUSHINGLESS CONNECTING ROD AND PROFILED PISTON PIN

BACKGROUND OF THE INVENTION

1. Field of the Invention

The present invention relates, generally, to a piston and connecting rod assembly for an internal combustion engine, and, more specifically, to such an assembly including a bushingless small-end connecting rod having a phosphatized coating for use with a profiled piston pin to improve wear of the piston/connecting rod pivot point and reduce deformation of the pin bore.

2. Description of the Related Art

Internal combustion engines known in the related art may generally include, among other basic components, an engine block having one or more cylinders, cylinder heads associated with the engine block and pistons supported for reciprocal movement in each cylinder. The piston generally includes a body having a crown and a skirt that depends from the crown to define the bottom half of the body of the piston. A pin bore is formed in the skirt. The pin bore corresponds to a similar bore at one end of the connecting rod. A pin is placed through the corresponding bores to attach the piston to the connecting rod. The end of a connecting rod having the piston pin bore is commonly referred to as the "pin end" or "small end." The other end of a connecting rod is fastened to the crankshaft at a particular location. This end of the connecting rod is commonly referred to as the "crank end" or "large end."

Generally, fuel is combusted within the cylinders to reciprocate the pistons. The piston drives the connecting rod, which drives the crankshaft, causing it to rotate within the engine block. Specifically, the combustion pressure within the cylinder drives the piston downward in a substantially linear motion. Focusing on the movement between the piston and the connecting rod, the term "top dead center" refers to the location of the piston at its uppermost point of reciprocal travel relative to the cylinder and is a point at which the piston is at a dead stop or zero velocity. Correspondingly, the term "bottom dead center" refers to the location of the piston at its lowermost point of reciprocal travel relative to the cylinder and is also a point at which the piston is at a dead stop or zero velocity. During movement of a piston from top dead center to bottom dead center on the powerstroke, the angle of the connecting rod produces a force component on the side of the piston commonly referred to as, "major thrust side." On the other hand, during return movement of a piston from bottom dead center to top dead center produces a force component on the side of the piston commonly referred to as, "minor thrust side." As fuel is combusted within a cylinder, the piston's reciprocal powerstroke and return movements drive the small end of the connecting rods in a substantially linear but slightly rotational motion. On the other hand, the large end of the connecting rod is attached to the crankshaft, which drives the large end of the connecting rod in a substantially rotational motion.

The combined linear and rotational movement of the connecting rod imposes a high level of stress on both the large end and small end pivot points. As between the two pivot points, the small end pivot point receives the greatest amount of stress, since it is adapted to facilitate angular movement of the connecting rod relative to the piston pin and piston skirt during the cycle from top dead center to bottom dead center and back. The combination of high loads, temperature, gas pressure and inertial forces localized at this pivot point requires that the small end of the connecting rod retain heightened properties relating to strength, wear, thermal stress and lubrication.

Stress imposed upon this pivot point may deform the piston pin, piston pin bore, and small end of the connecting rod. As a result of this deformation, the pivot point between the pin bore and connecting rod small end begins to scuff and wear. Scuffing in this area may lead to destruction of the pivot point and engine failure.

To counter the high loads imposed upon this pivot point, and to reduce friction and facilitate smooth angular movement, bronze bushings are typically employed between the bore of the small end of the connecting rod and the piston pin. The bushings reduce friction and facilitate smooth angular movement at this pivot point, thereby reducing deformation. However, bushings add weight to this pivot point and also require additional steps in manufacturing and assembly, both of which are generally undesirable.

Attempts have been made in the art to eliminate the bronze bushing from the assembly. For example, U.S. Pat. No. 5,158,695 issued to Yashchenko et al. on 27 Oct. 1992, discloses a material composed of copper, zinc, tin and diamond powder that is used in place of the conventional bronze bushings. However, the material disclosed in the '695 patent is applied to the piston pin and piston skirt but not to the connecting rod. Furthermore, in cases where bushings are not used, they are generally limited to either a diesel engine or for use with a non-profiled piston pin.

Accordingly, while the piston and connecting rod assemblies of the type known in the related art have generally worked for their intended purposes, they suffer from disadvantages relating to facilitating smooth angular movement at the pivot point while reducing weight in an internal combustion engine. As a result, there is an ongoing need in the art to improve the interface between the piston pin and the small end of the connecting rod, in general. Specifically, there is an ongoing need to reduce weight and streamline manufacturing process steps while retaining strength and acceptable product life of piston/connecting rod assemblies. Thus, there continues to be a need in the art for an improved piston pin and connecting rod assembly that is both lighter and stronger than previous generations of this assembly that still maintains good friction and wear properties.

SUMMARY OF THE INVENTION

The present invention overcomes the disadvantages in the related art in a piston pin and connecting rod assembly that generally fulfills a need in the art for bushingless small end connecting rod for use in internal combustion engines. To this end, the piston pin and connecting rod assembly of the present invention includes a piston adapted for reciprocal movement within a cylinder of the internal combustion engine. The piston has a body including a pin bore. The assembly further includes a connecting rod adapted to interconnect the piston and a crankshaft so as to translate the reciprocal movement of the piston into rotational movement of the crankshaft. The connecting rod has first and second ends with at least one of the ends including a bore extending therethrough and adapted to be aligned with the pin bore of the piston. The assembly also includes a pin adapted to be operatively received through the aligned pin bore of the piston and the bore extending through the end of the connecting rod. The pin includes a pair of distal ends, a center portion formed therebetween and a profiled outer circumference that is substantially circular in cross-section with a larger diameter at the distal ends than at the center portion. The end of the connecting rod is aligned with the piston pin bore and includes a phosphatized coating adapted to facilitate relative angular movement between the bore extending through the connecting rod and the outer circumference of the profiled piston pin. The alignment thereby facilitates reciprocal motion of the piston relative to the cylinder of an internal combustion engine.

Accordingly, one advantage of the present invention is that it improves scuff resistance of a piston pin and small end connecting rod pivot point for preventing seizures at the pivot point and prolonging the life of the relative components of an internal combustion engine.

Another advantage of the present invention is that it reduces the weight of an internal combustion engine by eliminating the need for a bushing at the pivot point between the small end connecting rod small end and the piston pin.

Still another advantage of the present invention is that it reduces the cost of manufacturing a piston and connecting rod assembly by eliminating the need for a bushing at the interface between the bore of the small end of the connecting rod and the piston pin.

Still another advantage of the present invention is that it reduces the cost of assembling a piston and connecting rod assembly by eliminating the need to install a bushing within the pivot point.

Other objects, features, and advantages of the present invention will be readily appreciated, as the same becomes better understood, after reading the subsequent description taken in conjunction with the accompanying drawings.

DETAILED DESCRIPTION OF THE INVENTION

Figure 1:
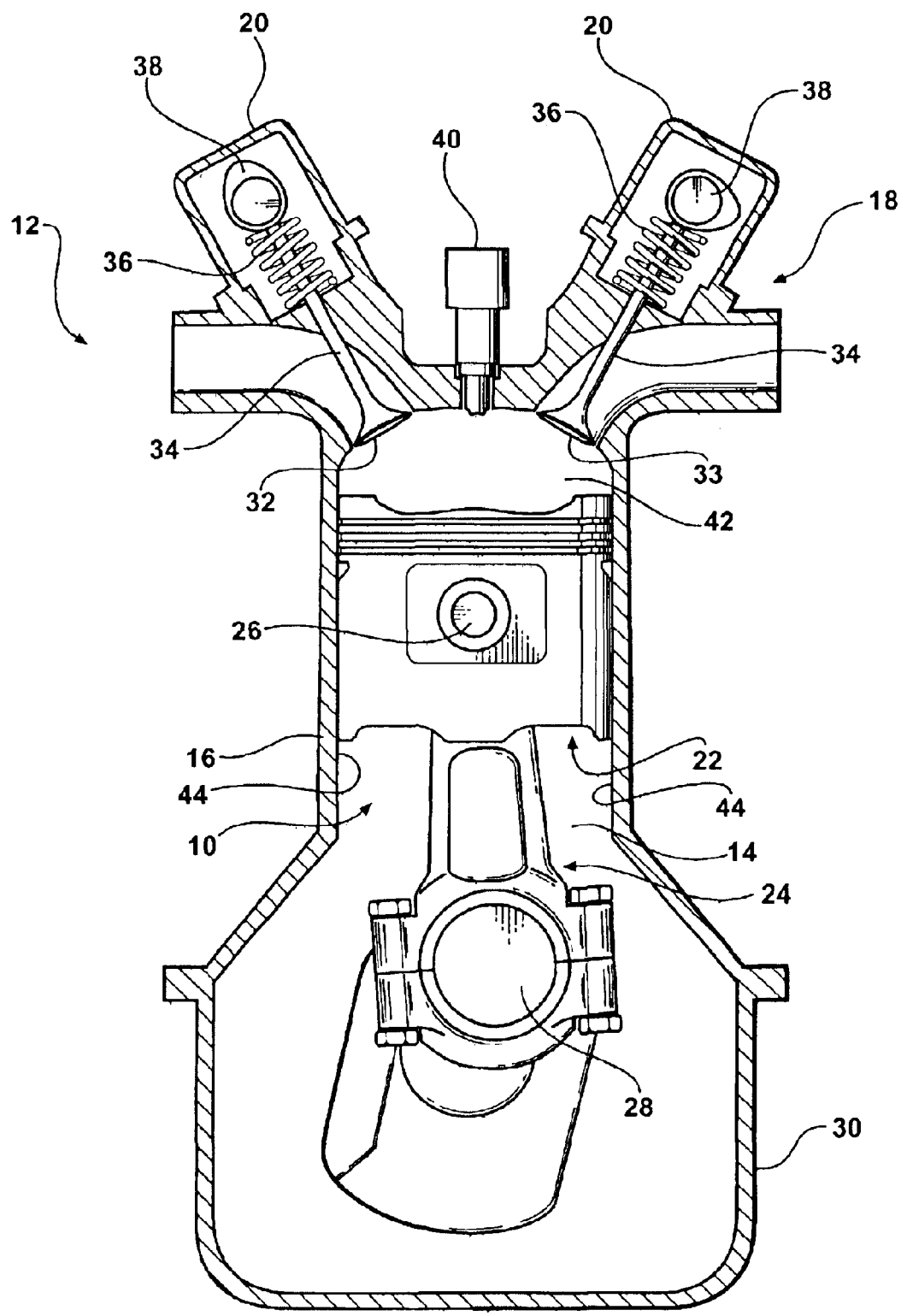
FIG. 1 is a cross-sectional environmental view of the piston and connecting rod assembly for use in an internal combustion assembly in accordance with the present invention.

The present invention overcomes the advantages in the related art in a piston and connecting rod assembly, generally indicated at 10 and 110, in FIGS. 1–8, where like numbers are used to designate like structures throughout the drawings. As shown in FIG. 1, the present invention is particularly adapted for use in an internal combustion engine, generally indicated at 12. In this case, the assembly 10 of the present invention is illustrated in connection with a single cylinder 14 of an internal combustion engine 12 having a dual-overhead cam arrangement. Those having ordinary skill in the art will appreciate that the engine 12 is but one of the many internal combustion engines within which the present invention may be employed. By way of example, the present invention may be employed within a two-stroke or four-stroke engine. The cylinder may be arranged in an in-line, v-shaped, or flat manner or in any other manner commonly known in the art. The present invention may also be employed with a carbureted or fuel injected internal combustion engine having single or dual overhead or undermount cam(s).

With continuing reference to FIG. 1, the internal combustion engine 12 includes an engine block 16 having one or more cylinders 14, and a cylinder head generally indicated at 18 associated with the engine block 16. Rocker panels 20 are associated with the cylinder head 18 in a manner commonly known in the art. A piston, generally indicated at 22, is supported for reciprocal movement in a cylinder 14. A connecting rod, generally indicated at 24, is secured to the piston 22 through a piston pin 26 as will be explained in greater detail below. A crankshaft 28 is associated with the connecting rod 24 and an oil pan 30 is associated with the engine block 16. An intake valve 32 and an exhaust valve 33, each having valve stems 34 and valve springs 36 are supported in the cylinder head 18 and are opened and closed via cams 38 to provide fluid communication between the cylinder 14 and the intake valve 32 and the exhaust valves 33. The internal combustion engine 12 also includes a spark plug 40 for igniting the fuel within the combustion chamber 42 defined by the cylinder walls 44 and above the piston 22. Alternatively, or in addition, the engine 12 may include a fuel injector as a means of introducing atomized fuel into the combustion chamber. Those having ordinary skill in the art will appreciate that the engine 12 also includes a number of other conventional components that are commonly known in the art and will not be described in detail here.

Generally, fuel is combusted within the combustion chamber 42 of a cylinder 14 to reciprocate the piston 22. The piston 22 drives the connecting rod 24, which drives the crankshaft 28, causing it to rotate within the engine block 16. Specifically, the combustion pressure within the cylinder 14 drives the piston 22 downward in a substantially linear, but slightly rotational motion. On the other hand, movement of the crankshaft 28 drives the connecting rod 24 in a substantially rotational motion.

Figure 2:
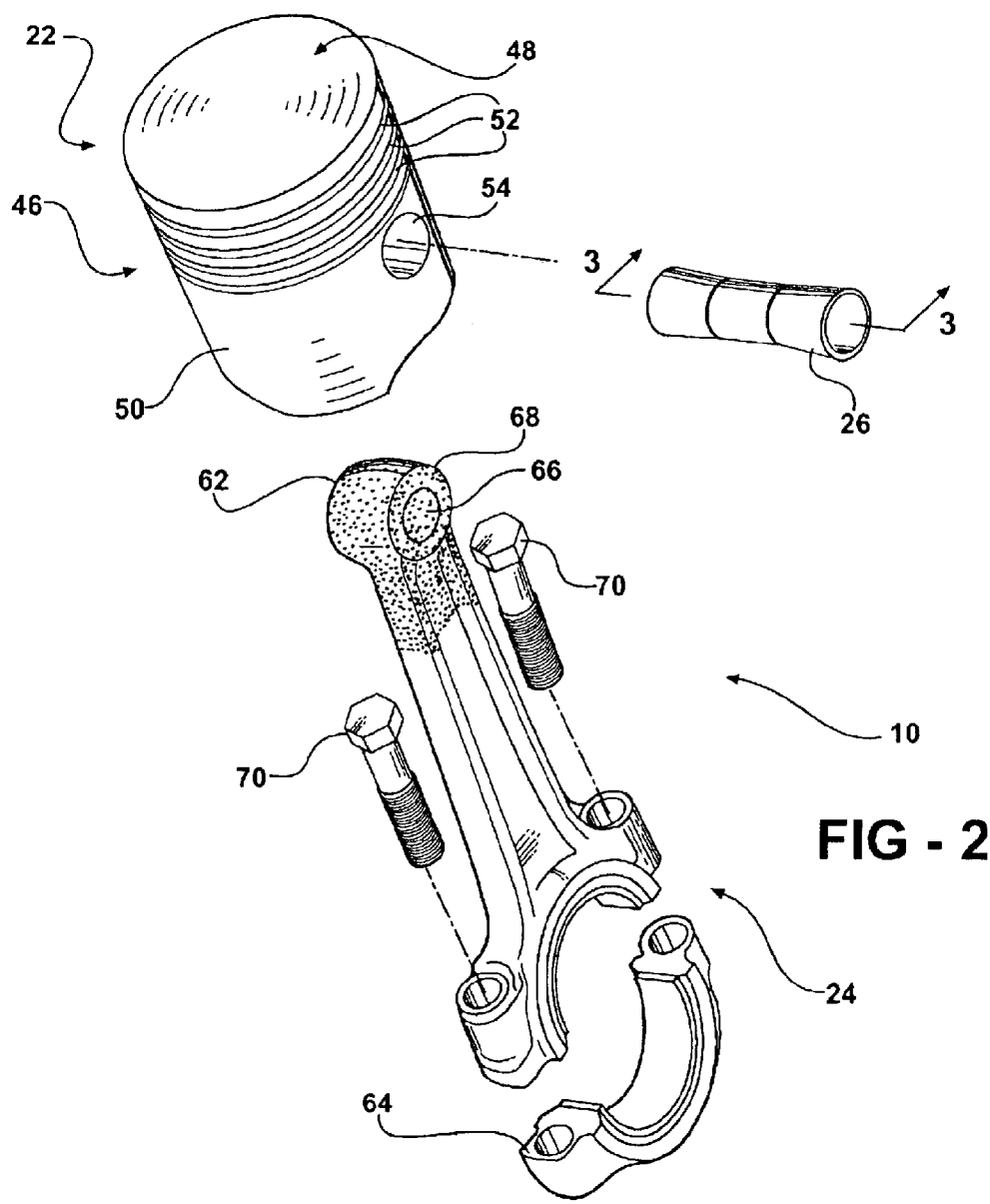
FIG. 2 is an exploded view of one embodiment of the piston and connecting rod assembly in accordance with the present invention.

As shown in FIG. 2, the piston 22 includes a body 46 having a crown 48 formed at the uppermost margins of the body 46 and a skirt 50 depending from the crown 48. Ring lands 52 extend about the outer circumference of the body 46 between the crown 48 and the skirt 50. The ring lands 52 are adapted to retain piston rings (not shown, but generally known in the art). The body 46 further includes a pin bore 54 formed therein. As shown in the Figures, the pin bore 54 includes a substantially circular circumference; however, those having ordinary skill in the art will appreciate that the pin bore 54 may include a variety of shapes. By way of example the pin bore 54 may include a substantially oval circumference. The pin bore 54 is adapted to receive the piston pin 26 as will be explained in greater detail below. Those having ordinary skill in the art will appreciate that within the scope of the present invention, pistons can have many different shapes, sizes, and other structural features. By way of example, the pistons may include any number of ring lands 52, or protrusions and/or recesses on the crown 48 for facilitating the combustion process and enhancing the power or efficiency derived therefrom. Furthermore, the pistons 22 may include recesses or grooves formed on the piston skirt 50 or a coating applied to the piston skirt 50. Still further, pistons 22 may include a burnished or chamfered pin bore 54. The pin bore 54 may also include side reliefs (see FIG. 6) for receiving lubrication between the pin bore 54 and piston pin 26.

Figure 3:
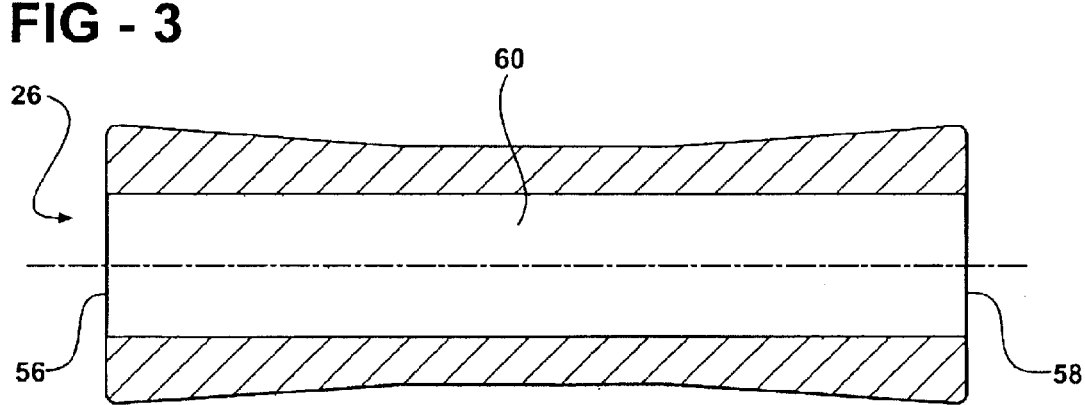
FIG. 3 is an enlarged cross-sectional view of the profiled piston pin employed in the piston and connecting rod assembly of the present invention.

Referring to FIGS. 1–3, the piston pin 26 includes a pair of distal ends 56 and 58, and a center portion 60 formed therebetween. While a tubular piston pin has been adopted as the standard for most applications, reducing the diameter in the center area of the piston pin 26 provides a relief of the pressure on the connecting rod 24 and leads to an increase in pin bore 54 strength. Accordingly, as shown in FIG. 3, the piston pin 26 of the present invention includes a profiled outer circumference that is substantially circular in cross-section with a larger diameter at the distal ends 56, 58 than at the center portion 60. Accordingly, those having ordinary skill in the art will appreciate that a piston pin 26 may be operatively assembled relative to the pin bore 54 and connecting rod 24 through any number of manufacturing processes.

As mentioned above, the connecting rod 24 is adapted to interconnect the piston 22 and a crankshaft 28 so as to translate the reciprocal movement of the piston 22 into rotational movement of the crankshaft 28. To this end, the connecting rod 24 includes a first end 62 and a second end 64 with at least one of the ends having a bore 66 extending theretbrough. The bore 66 defines an inner circumference. As shown in the Figure, the inner circumference of the bore 66 is substantially circular; however, those having ordinary skill in the art will appreciate that the inner circumference of the bore 66 may also define a plurality of other shapes. By way of example the inner circumference of the bore 66 may be substantially oval or include a tapered profile. The bore 66 is adapted to be aligned with the piston pin bore 54. The end 62 including the bore 66 further includes a bore housing 68 depending therefrom. The opposing end 64 of the connecting rod 24 is operatively secured to the crankshaft 28 through bolts 70. While the standard shape of the end 62 of the connecting rod 24 is best shown in FIG. 2, those having ordinary skill in the art will appreciate that reduced weight and improved lubrication to the bore 66 may be achieved through employing a connecting rod 24 having a modified bore housing 68.

Figure 4:
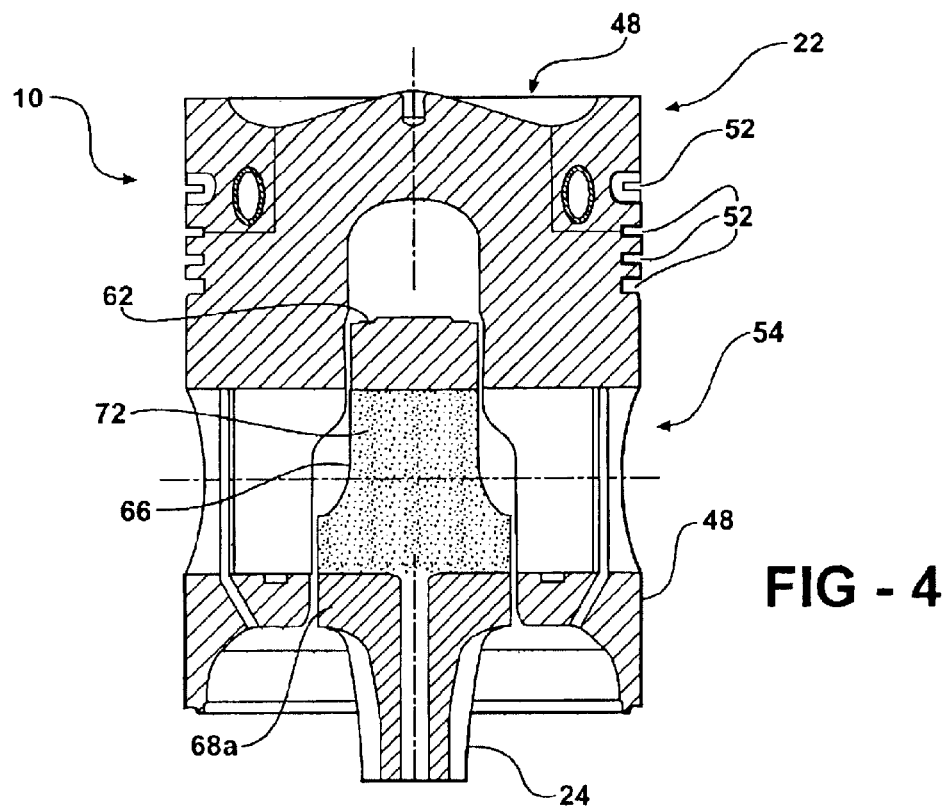
FIG. 4 is a cross-sectional view of one embodiment of the piston and connecting rod assembly of the present invention where the connecting rod is shown having a stepped configuration.
Figure 5:
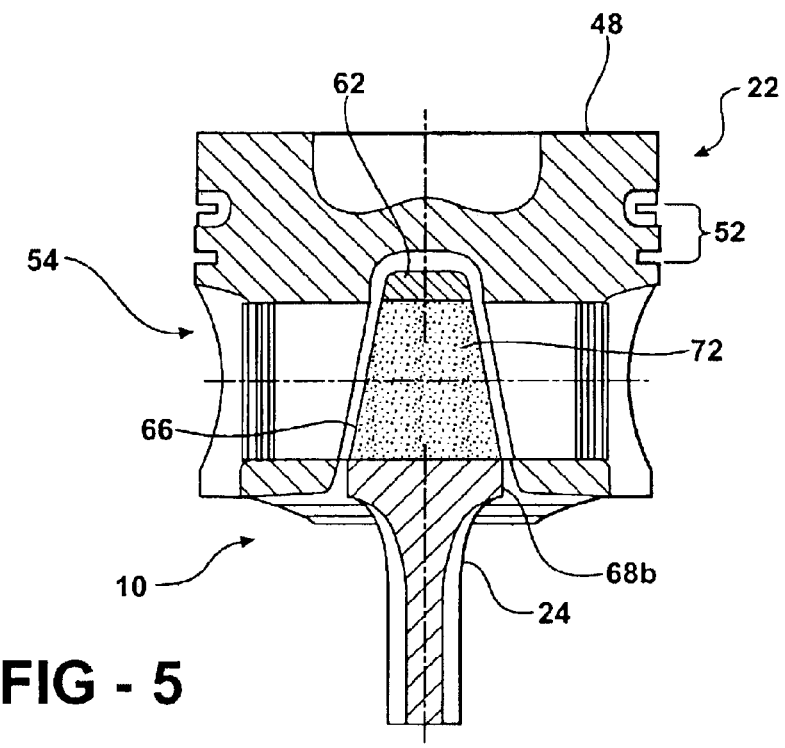
FIG. 5 is a cross-sectional view of another embodiment of the piston and connecting rod assembly of the present invention where the connecting rod is shown having a trapezoidal configuration.

As alternatively shown in FIGS. 4–5 where like numerals, increased in alphanumeric sequence, are used to designate like structure, the bore housing 68a and 68b may taper inwardly toward the end 62 of the connecting rod 24. As shown in FIG. 4, the bore housing 68a tapers in a substantially stepped manner, while the bore housing 68b shown in FIG. 5 tapers in a substantially trapezoidal manner. However, those having ordinary skill in the art will appreciate that the alternative shapes of the bore housings 68a and 68b shown in FIGS. 4 and 5 are intended to be illustrative and not exhaustive. Accordingly, connecting rods 24 having bore housings of all shapes are intended to be within the scope of the present invention.

The combined linear and rotational movement of the connecting rod 24 imposes a high level of stress on the pivot point between the connecting rod 24, and the piston 22, through the piston pin 26. The combination of high loads, temperature, gas pressure and inertial forces localized at this pivot point mandates that the contact areas of the connecting rod 24, piston 22, and piston pin 26 retain heightened properties relating to strength, thermal stress and lubrication. Without such heightened properties, the pivot point between the piston 22, connecting rod 24, and piston pin 26 can scuff and ultimately fail. Accordingly, it is important to ensure that the pivot point between the piston 22, connecting rod 24 and piston pin 26 remains resistant to thermal stress and load fatigue while maintaining good friction and wear resistant properties during operation of the engine 12.

To this end, as shown in FIGS. 1–5, the end 62 of the connecting rod 24 including the bore 66 is adapted to receive a phosphatized coating 72. In the preferred embodiment, the coating 72 is a manganese phosphate solution. Moreover, the phosphatized coating 72 is applied to the inner circumference of the bore 66 so as to be interposed between the inner circumference of the bore 66 and the piston pin 26. The phosphatized coating 72 may be bonded solely to the inner circumference of the bore 66 extending through the end 62 of the connecting rod 24. However, the phosphatized coating 72 of the present invention is preferably applied to the connecting rod 24 by dipping the connecting rod 24 in the manganese phosphate solution. Nevertheless, those having ordinary skill in the art will appreciate that the phosphatized coating 72 may be applied in any known manner. By way of example, the phosphatized coating 72 may be applied through a spraying or swabbing process. Furthermore, those having ordinary skill in the art will appreciate that components of the present invention other than the connecting rod 24 may also receive a phosphatized coating 72, as will be explained in greater detail below.

Figure 7:
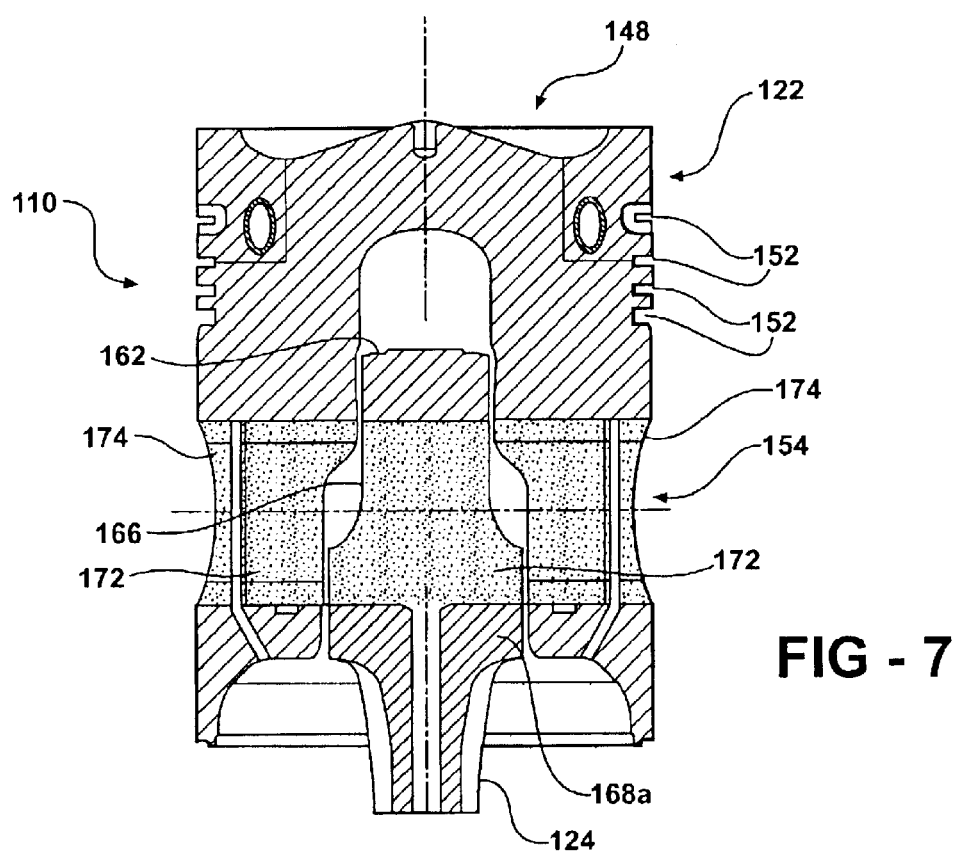
FIG. 7 is a cross-sectional view of the piston and connecting rod assembly of the present invention where the phosphatized connecting rod is shown having a stepped configuration and the piston pin bore includes a phosphatized coating.
Figure 8:
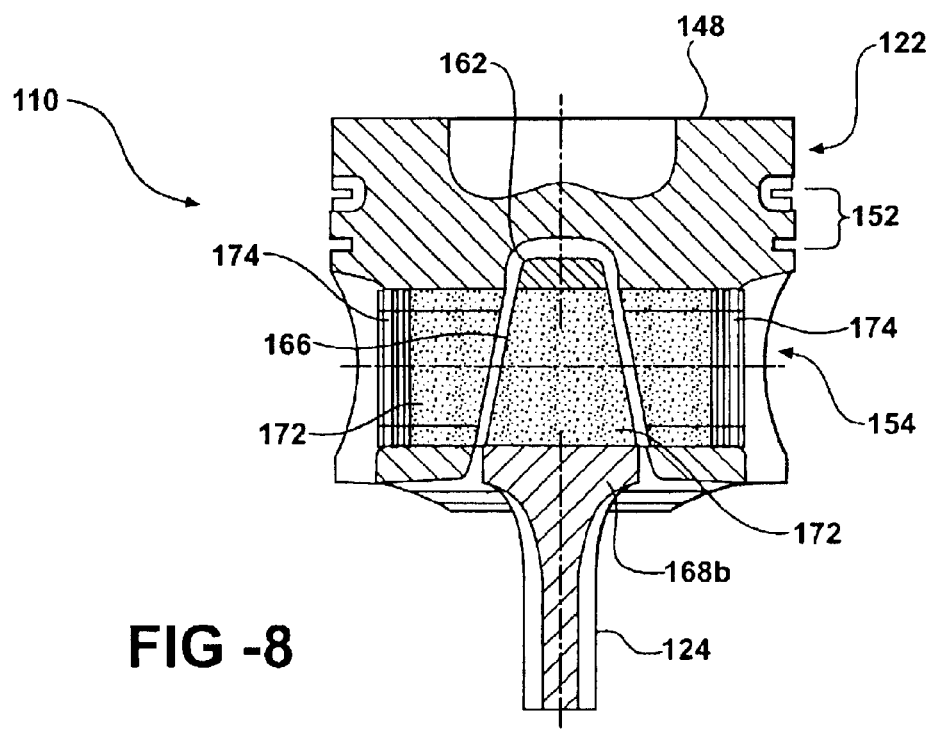
FIG. 8 is a cross-sectional view of the piston and connecting rod assembly of the present invention where the phosphatized connecting rod is shown having a trapezoidal configuration and the piston pin bore includes a phosphatized coating.
Figure 6:
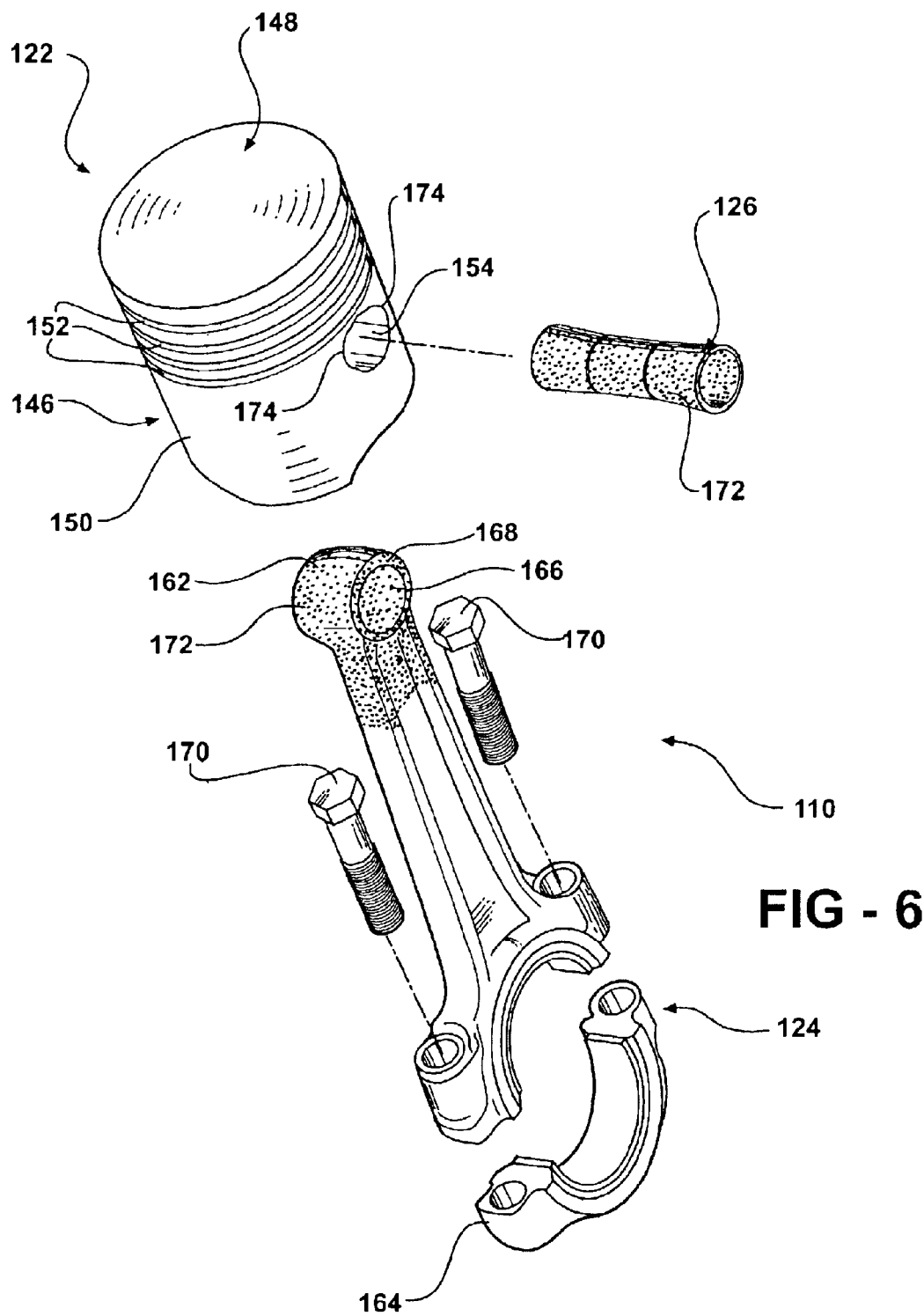
FIG. 6 is an exploded view of another embodiment of the piston and connecting rod assembly in accordance with the present invention where the profiled piston pin includes a phosphatized coating.

An alternative embodiment of the piston and connecting rod assembly of the present invention is generally indicated at 110 in FIGS. 6–8 where like numerals, increased by 100 with respect to the embodiment of the invention illustrated in FIGS. 1–5, are used to designate like structure. The assembly 110 of the present invention as shown in FIGS. 6–8 is substantially similar in structure to the assembly 10 shown in FIGS. 1–5 and so the description of the piston will not be repeated here except where expressly mentioned below. The assembly 110 shown in FIG. 6 is adapted for use with a piston 122 having a body 144 including a pin bore 154 formed therein. The pin bore 154 of the piston 122 defines an inner circumference including side relief channels 174 adapted to receive lubrication between the piston pin 126 and the inner circumference of the pin bore 154. As shown in FIGS. 7 and 8, the pin bore 154 of the piston 122 is adapted to receive a phosphatized coating 172. Accordingly, the phosphatized coating 172 is applied to the inner circumference of the pin bore 154 so as to be interposed between the inner circumference of the pin bore 154 and the piston pin 122.

With continuing reference to FIGS. 6–8, the assembly 110 of the present includes a connecting rod 124 having first and second ends, 162 and 164, respectively, with at least one of the ends 162 including a bore 166 extending therethrough. The connecting rod bore 166 is adapted to be aligned with the pin bore 154 of the piston 122 and to receive a phosphatized coating 172. Preferably, the phosphatized coating 172 is a manganese phosphate solution.

As alternatively shown in FIGS. 7 and 8 where like numerals, increased in alphanumeric sequence, are used to designate like structure, the bore housing 168a and 168b may taper inwardly toward the phosphatized coated terminal end 162 of the connecting rod 124. As shown in FIG. 7, the bore housing 168a tapers in a substantially stepped manner, while the bore housing 168b shown in FIG. 5 tapers in a substantially trapezoidal manner. However, those having ordinary skill in the art will appreciate that shapes of the bore housings 168a and 168b shown in FIGS. 7 and 8 are intended to be illustrative and not exhaustive. Accordingly, connecting rods 124 having bore housings of all shapes are intended to be within the scope of the present invention.

As best shown in FIG. 6, the assembly 110 further includes a piston pin 126 adapted to be operatively received through the aligned pin bore 154 in the piston 122 and the bore 166 extending through the end 162 of the connecting rod 124. The piston pin 126 shown in FIG. 6 is substantially similar to the piston pin 26 shown in FIGS. 1–3, and has a profiled outer circumference. However, the piston pin 126 illustrated in FIG. 6 includes a phosphatized coating 172. As in the case of the other embodiments discusses herein, the phosphatized coating 172 is preferably made from a manganese phosphate solution. Accordingly, the piston pin 126 of FIGS. 6–8 incorporates the alternative embodiments and/or methods of attachment to the piston 122 and connecting rod 124 disclosed with respect to the piston pin 26 illustrated in FIGS. 1–5 as though fully set forth with respect to the embodiment illustrated in FIG. 6.

The connecting rod and piston pin assembly 10, 110 as illustrated in FIGS. 1–8 includes a phosphatized coating 72, 172 applied to the connecting rod 24, 124. The piston pin 26, 126 has a profiled outer circumference. Accordingly, the present invention improves scuff resistance of a connecting rod 24, 124 and a piston pin 26, 126 during operation of an internal combustion engine 12 for prolonging the life of the relative components of an internal combustion engine 12. Further, the piston and connecting rod assembly 10, 110 of the present invention eliminates the need for a bushing at the interface between the piston pin 26, 126 and the bore 66, 166 through the small end of the connecting rod. In this way, the present invention reduces weight within an internal combustion engine 12 and reduces the cost of manufacturing and assembling a piston pin and connecting rod assembly 10, 110.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A piston and connecting rod assembly for use with an internal combustion engine, said assembly comprising:
    a piston adapted for reciprocal movement within a cylinder of the internal combustion engine, said piston having a body including a pin bore formed therein;
    a connecting rod adapted to interconnect said piston and a crankshaft so as to translate the reciprocal movement of the piston into rotational movement of the crankshaft, said connecting rod having first and second ends with at least one of said ends including a terminal end and a bore housing depending therefrom that tapers inwardly toward said terminal end, said bore housing having a bore extending therethrough and adapted to be aligned with said pin bore in said piston;
    a pin adapted to be operatively received through said aligned pin bore in said piston and said bore extending through said end of said connecting rod, said pin including a pair of distal ends, a center portion formed therebetween and a smoothly profiled outer circumference that is substantially circular in cross-section with a larger diameter at said distal ends than at said center portion and tapers gradually from said distal ends to said center portion; and
    said end of said connecting rod aligned with said piston pin bore including a phosphatized coating that is adapted to facilitate relative angular movement between said bore extending through said connecting rod and said outer circumference of said profiled piston pin thereby facilitating reciprocal motion of said piston relative to the cylinder of an internal combustion engine.

2. The assembly as set forth in claim 1 wherein said bore extending through said end of said connecting rod defines an inner circumference, said phosphatized coating being applied to said inner circumference so as to be interposed between said inner circumference and said pin.

3. The assembly as set forth in claim 1 wherein said phosphatized coating is bonded to said inner circumference of said bore extending through said end of said connecting rod.

4. The assembly as set forth in claim 1 wherein said bore housing tapers inwardly toward said terminal end in a substantially trapezoidal manner.

5. The assembly as set forth in claim 1 wherein said bore housing tapers inwardly toward said terminal end in a substantially stepped manner.

6. The assembly as set forth in claim 1 wherein said pin includes a phosphatized coating about said profiled outer circumference.

7. The assembly as set forth in claim 1 wherein said pin bore in said piston body defines an inner circumference and a phosphatized coating interposed between said inner circumference and said pin.

8. A piston and connecting rod assembly for use with an internal combustion engine, said assembly comprising:
    a piston adapted for reciprocal movement within a cylinder of the internal combustion engine, said piston having a body including a pin bore formed therein;
    a connecting rod adapted to interconnect said piston and a crankshaft so as to translate the reciprocal movement of the piston into rotational movement of the crankshaft, said connecting rod having first and second ends with at least one of said ends including a terminal end and a bore housing depending therefrom that tapers inwardly toward said terminal end, said bore housing having a bore extending therethrough and adapted to be aligned with said pin bore in said piston;
    a pin adapted to be operatively received through said aligned pin bore in said piston and said bore extending through said end of said connecting rod, said pin including a pair of distal ends, a center portion formed therebetween and a smoothly profiled outer circumference that is substantially circular in cross-section with a larger diameter at said distal ends than at said center portion and tapers gradually from said distal ends to said center portion, said profiled outer circumference having a phosphatized coating bonded thereto, and
    said end of said connecting rod aligned with said piston pin bore including a phosphatized coating that is adapted to facilitate relative angular movement between said bore extending through said connecting rod and said outer circumference of said profiled piston pin thereby facilitating reciprocal motion of said piston relative to the cylinder of an internal combustion engine.

9. The assembly as set forth in claim 8 wherein said bore extending through said end of said connecting rod defines and inner circumference, said phosphatized coating being interposed between said inner circumference of said bore and said outer circumference of said profiled piston pin.

10. The assembly as set forth in claim 8 wherein said bore housing tapers inwardly toward said terminal end in a substantially trapezoidal manner.

11. The assembly as set forth in claim 8 wherein said bore housing tapers inwardly toward said terminal end in a substantially stepped manner.

12. The assembly as set forth in claim 8 wherein said pin bore of said piston includes side relief channels along said inner circumference of said pin bore adapted to receive lubrication between said pin and said inner circumference of said pin bore.

13. The assembly as set forth in claim 8 wherein said pin bore of said piston body defines an inner circumference and a phosphatized coating between said inner circumference and said pin.

* * * * *